United States Patent [19]

McHugh et al.

[11] Patent Number: 5,252,212
[45] Date of Patent: Oct. 12, 1993

[54] SPRAY FORMING POLYMER MEMBRANES, COATINGS AND FILMS

[75] Inventors: Kevin M. McHugh, Idaho Falls; Lloyd D. Watson, Rigby; Richard E. McAtee, Idaho Falls; Scott A. Ploger, Rigby, all of Id.

[73] Assignee: FG&G Idaho Inc., Idaho Falls, Id.

[21] Appl. No.: 748,156

[22] Filed: Aug. 21, 1991

[51] Int. Cl.⁵ ............................................... B01D 67/00
[52] U.S. Cl. .............................. 210/490; 210/500.27; 427/246
[58] Field of Search ............... 427/245, 246, 301; 55/16, 158; 210/490, 500.27, 500.42; 264/13

[56] References Cited

U.S. PATENT DOCUMENTS 3,615,024 10/1971 Michaels .................. 210/500.42 X
3,808,091 4/1974 Aokl et al. ........................ 264/13 X
4,710,204 12/1987 Kraus et al. ......................... 55/16
4,797,187 1/1989 Davis et al. ...................... 427/301 X Primary Examiner—Frank Spear
Attorney, Agent, or Firm—Alan D. Kirsch

[57] ABSTRACT

A method of forming a polymer film having controlled physical and chemical characteristics, wherein a plume of nebulized droplets of a polymer or polymer precursor is directed toward a substrate from a converging-/diverging nozzle having a throat at which the polymer or a precursor thereof is introduced and an exit from which the nebulized droplets of the polymer or precursor thereof leave entrained in a carrier gas. Relative movement between the nozzle and the substrate is provided to form a polymer film. Physical and chemical characteristics can be controlled by varying the deposition parameters and the gas and liquid chemistries. Semipermeable membranes of polyphosphazene films are disclosed, as are a variety of other polymer systems, both porous and non-porous.

29 Claims, 3 Drawing Sheets

SPRAY FORMING POLYMER MEMBRANES, COATINGS AND FILMS

CONTRACTUAL ORIGIN OF THE INVENTION

The United States Government has rights in this invention pursuant to Contract No. DE-AC07-76ID01570 between the U.S. Department of Energy and E G & G Idaho Inc.

BACKGROUND OF THE INVENTION

The present invention relates to a method for forming a polymer film having controlled physical characteristics such as thickness and solidification rates from heated solutions with variable solvent concentrations and articles of manufacture produced thereby.

This invention relates to a new use of a spray forming process which has been developed at the Idaho National Engineering Laboratory (INEL), the process is now referred to as the Controlled Aspiration Process (CAP). The CAP process is set forth in some detail in U.S. Pat. No. 4,919,853 issued to Alvarez and Watson, Apr. 24, 1990, for Apparatus and Method For Spraying Liquid Materials, the disclosure of which is herein incorporated by reference. The nozzle herein identified as a converging/diverging nozzle is the nozzle disclosed in the '853 patent.

The CAP process of spray forming metals aspirates a molten metal into the throat of a converging/diverging gas nozzle, where the liquid is nebulized into a directed spray of rapidly cooling droplets. The gas flow (usually an inert gas such as argon) accelerates the droplets toward the substrate, against which the droplets impact before completely solidifying. Rapid cooling occurs in flight by a variety of thermodynamic mechanisms including convection and radiation as well as by convection and conduction upon arrival at the substrate surface. Temperature control in the CAP process may be achieved by varying one or more of the carrier gas, the nozzle, the temperature of the material being sprayed in its reservoir or tundish or the substrate receiving the nebulized droplets. The droplets deposition and solidification can be closely controlled in the CAP process by temperature and pressure control to produce a polymer film with predetermined physical and chemical properties.

By substituting various polymers for metal in some cases rather unexpected and surprising results have been obtained. Rapid solidification of the nebulized polymer droplets in the plume produced by the CAP process has in some cases resulted in production of asymmetrical polymer membranes having superior separation properties.

The CAP process is beneficial because with it polymers which cannot readily be dissolved in solvents can be sprayed and polymer systems normally sprayed with solvents can be sprayed without. This is an important environmental benefit due to the severe reduction in VOC (volatile organic compound) emissions associated with spraying paints and enamels. The CAP process can be manipulated to control the deposition and solidification of any polymer film. Due to the uniform droplet size distribution in the plume from the CAP process, consistent film thickness and spatially uniform film physical and/or chemical properties are achieved.

The CAP coating capabilities provide precise control of the spray forming process and the deposits which result therefrom have relatively low porosity due to the low gas pressure used in the CAP process resulting in a low droplet velocity. Particularly, using pressures in the range of about 14-26 psi absolute, normalized to one atmosphere, low droplet velocity results in gentle droplet impact conditions at the substrate surface and like gas entrapment.

Most separation processes for solutes and suspended materials are performed using either membranes or filters. The main distinction between a filter and a membrane is that filter pores tend to be arranged adjacent to each other, forming an array of holes. Porosity is not well-connected in a membrane, so atomic/molecular traverses must occur either along very tortuous pathways or by diffusion, resulting in rather low permeabilities and slow speeds of migration. Consequently, filters are normally used to remove relatively large objects from a liquid medium, such as particulates and suspended solids, while membranes are often better suited for separating chemicals in solutions. This distinction is no longer precise, however, when microfilters and high permeability membranes are discussed, where differences can be quite minor.

At the Idaho National Engineering Laboratory (INEL), there has been substantial work on polyphosphazene membranes useful in harsh environments, both chemical and physical, the work has been reported in the Allen et al. U.S. Pat. No. 4,749,489 issued Jun. 7, 1988, the disclosure of which is incorporated herein by reference. The polyphosphazenes are useful as semipermeable membranes because they may be used for separations at temperatures in excess of 179° C. and at pressures in excess of $1.8 \times 10^6$ Pa. In addition, the membranes formed from the polyphosphazene as reported in the '489 patent, may be useful in harsh chemical conditions. There are other polymer systems which can be sprayed with the CAP process that can exist in harsh environments such as Teflon and other fluorochloro substituted polyethylenes. Although polyphosphazene is used to explain the operation of the CAP process it should be remembered that the process is a means to manipulate various polymers and systems of polymers and is not limited to any one polymer or system of polymers.

Polyphosphazenes are a polymeric material having an inorganic backbone comprising alternating nitrogen and phosphorus atoms which are in turn connected by alternating double bonds. Three basic polymer types can be prepared: linear, cyclolinear and cyclomatrix, as illustrated below:

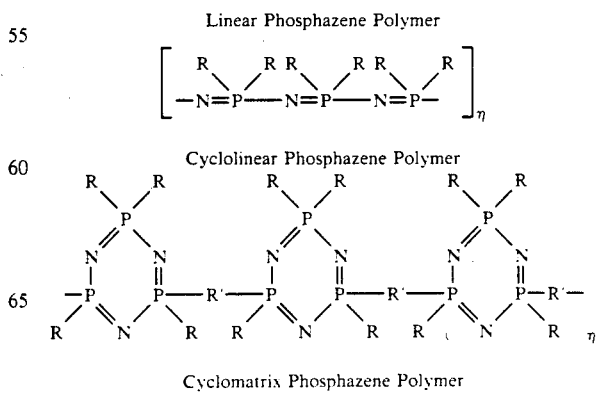

-continued

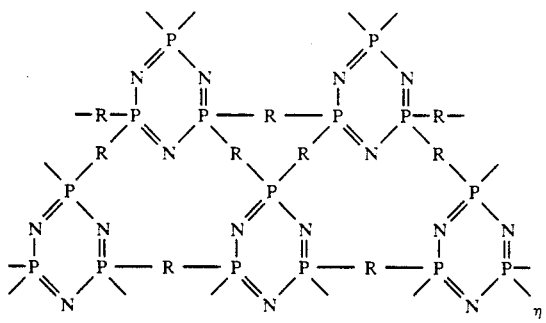

A base unsaturated phosphazene polymer has two chlorine atoms attached to each phosphorous. These chlorine can be substituted by organic groups such as hydroxyl (R—OH), primary amine (R—NH$_2$), secondary amines (R$_2$—NH) or mercapto (R—SH) groups. In general, the polyphosphazene polymers for use in forming the membranes of the subject invention may be prepared using one of Allcock's procedures. H. R. Allcock, "Phosphorous-Nitrogen Compounds—Cyclic, Linear, and High Polymeric Systems," Academic Press, New York 1972, Chapter 16. Substituted polyphosphazene polymers may be derived from the cyclotrimer hexahalocyclotriphosphazene (usually the hexachlorotrimer is used). When heated to about 250° C., the trimer (hexachloro) polymerizes by a ring cleavage mechanism to form the linear polydichlorophosphazene. A variety of side groups can be attached to the polymer by nucleophilic replacement of the halide side groups with alkoxy-, aryloxyamino or thio groups. Alkyl and aromatic groups can be attached to the polymer by the reaction of polydihalophosphazene with organometallic nucleophiles. In these reactions, the preferred substrate is polydifluorophosphazene. The cyclolinear and cyclomatrix polymers may be prepared by reacting the cyclic trimer with a difunctional monomer. The type of polymer obtained is dependent on the mole ratios of the reactants used and available reactive sites on the trimer. Such reactions are taught by Allcock and are well known in the art. H. R. Allcock, "Phosphorus-Nitrogen Compounds-Cyclic, Linear, and High Polymeric Systems," Academic Press, New York 1972, Chapter 16, which teachings are incorporated herein in their entirety.

From the examples and test results reported in the '489 patent, it is apparent that various membranes can be prepared from phosphazene polymers, which can be selectively synthesized to have the capability of separating only desired solutes from a fluid, whether gas or liquid. This capability is achieved through the substitution of various select groups on the phosphorus atom in the polymer structure. The resulting polyphosphazene is highly heat resistant as well as being chemically resistant. Thus, harsh environments, such as high or low pH, organic solvents and high temperatures will present only minimal deterrents to the use of polyphosphazene membranes in separation techniques.

The CAP process is uniquely capable of spray forming thin layers of synthetic organic resins with superior properties. The polymer layers thus formed can be permanently bonded, where desired, to the base material by chemical reaction or by surface interlinkage. When polymer layers have been deposited by the CAP process, there is nearly complete consolidation of the incident polymer droplet at the substrate for a thickness of about 1 micron and nearly theoretically dense structures are formed. In some cases, a layer can be uniformly dense throughout, while in other cases, deposits after about 1 micron are more porous, thereby producing an asymmetrical membrane having (in the polyphosphazene hereinafter disclosed) vastly superior selectivity over membranes made by knife casting, spin casting or other well known methods.

SUMMARY OF THE INVENTION

It is an object of the invention to provide an improved method of forming a polymer film.

Another object of the invention is to provide an improved method of spraying polymers having predetermined characteristics useful as semipermeable membranes for separating a wide variety of materials and the membranes prepared thereby.

Still another object of the invention is to spray polymers as protective coatings with little or no solvent emission.

Yet another object of the invention is to spray very thin or otherwise delicate films or membranes onto strength providing substrates, including mesh, porous and non-porous substrates.

Another object of the subject invention is to provide an improved method of forming controlled thickness membranes wherein the CAP process is used to form asymmetrical membranes capable of withstanding high temperatures and harsh chemical conditions.

Yet another object of the invention is to provide a method of forming a polyphosphazene membrane and the membrane formed thereby capable of being tailored for specific ion and/or solute rejection properties through the selective modification of side groups on the polymer chain.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
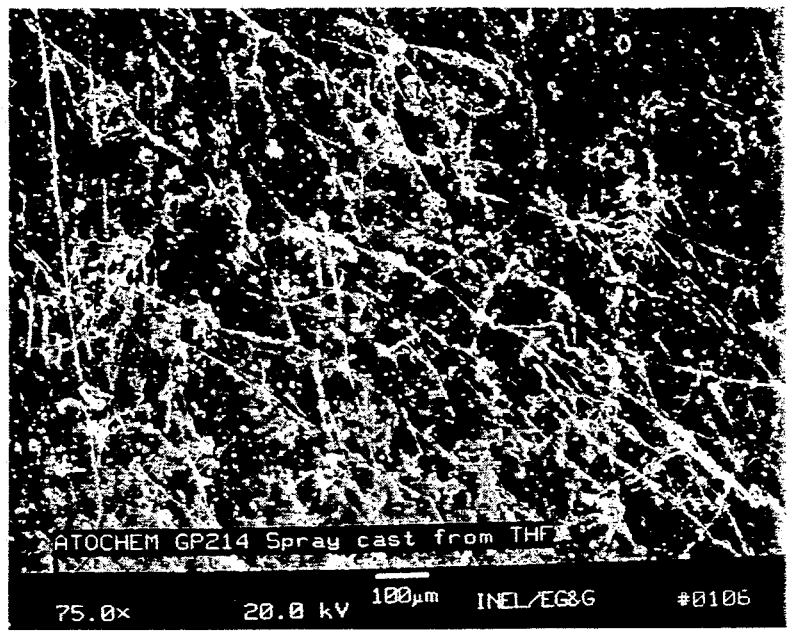
FIG. 1 is a photomicrograph of a spray cast plastic material at 75 times magnification.

A variety of experiments were conducted using the converging/diverging nozzle of the '853 patent. Variables in the experiments included the type of synthetic organic resins used, the type of substrates used, the relative speeds between the nozzle and the substrate, the molecular weight distribution of the material being sprayed, the content of the carrier gas, the distance between the substrate and the nozzle, and the location of the second constituent in a copolymer where a copolymer is to be formed.

Although specific examples herein will be principally described with reference to the polyphosphazene polymers, it should be understood that other polymers are equally applicable to the present process and may be used interchangeably with the spray forming method for the polyphosphazenes.

Moreover, the invention has particular applicability to different polymer systems, particularly polymers which are difficult or almost impossible to dissolve, such as fully halogenated polyethylenes and polymers normally sprayed in solvents which are deleterious to the atmosphere. For instance, automobile paint can be applied without using solvents, thereby avoiding or significantly reducing VOC emission. Any polymer that can be melted or dissolved can be sprayed. Films of substantially uniform thickness and porosity can be sprayed onto almost any substrate for a variety of purposes. The CAP process provides a system of enormous flexibility capable of depositing "designer" films. By that we mean, the system parameters can be varied to spray films of controlled chemistry, porosity, thickness and symmetry. Chemistry of the film can be controlled by mixing precursors in the tundish, by providing several tundishes, by mixing a chemically active gas with the carrier gas or by administering a reactant to the plume or at the substrate. Porosity can be controlled by temperature and/or pressure control or by varying the volume of material nebulized. Thickness is controlled by the relative movement between the nozzle and the substrate, the amount of material in the plume, the number of passes of the nozzle with respect to the substrate.

Specifically, experiments have been run with solutions of poly[bis(2,2,2-trifluoroethoxy)phosphazene] (PTFEP) in tetrahydrofuran (THF), as well as hexachlorocyclotriphosphazene and polydichlorophosphazene. Additionally, poly[bis(butylamino)phosphazene] has been used to form membranes as has poly[(diethylaminoorgano)phosphazene] have been used as have the other polyphosphazenes listed in the examples of the '489 patent. Polyphosphazenes have been mixed either with THF as a solvent or acetone.

Ethylacetate is also acceptable as a solvent as well as any organic material which will dissolve the resin of interest and which preferably has a vapor pressure of 100-200 Torr at room temperature. However, any solvent that evaporates readily will be adequate even with vapor pressure greater than 200 Torr. Solvents with vapor pressures less than 100 Torr can be used if the carrier gas is heated. As stated in the '489 patent, polyphosphazene polymers have been laid down by doctor blade, by spincasting and the like, but in all of these cases, the membrane produced is a symmetrical membrane. A symmetrical membrane has the same porosity or density throughout, whereas in a membrane prepared by the CAP process, the porosity or density may, if desired, vary from near theoretical density or substantially no porosity at the portion of the membrane adjacent the substrate on which it is sprayed to a less dense or more porous surface away from the substrate. A membrane having different densities is defined as an asymmetric membrane and surprisingly, such asymmetric membranes have produced extraordinarily improved separations compared to symmetric membranes.

As stated before, various polymers may be used which are perfectly acceptable for this process. By way of illustration, without limitation to the invention whatsoever, the phosphazenes may be used, as well as combinations of polyurethanes and polyamides, representing cross linked polymers. Polyethylene may be used either uncrosslinked or crosslinked by subjection to UV light or a peroxide such as dicumyl peroxide along with a wide variety of other polymer or polymer precursors. The polymers may be sprayed against a variety of substrates. For instance, the substrate may be glass, quartz, wood, meshes, both metal and plastic, or metal. The sprayed polymer may be detachable from the substrate, as for instance, when a glass substrate is used and a polymer having a hydrophobic moiety is sprayed thereagainst. Such a polymer will delaminate in the presence of water. Other polymers may be sprayed onto substrates and adhered by mechanical adhesion as when the substrate is roughened, for instance paints are of this type. On the other hand, metal substrates may receive an adherent film if a carboxylated polymer is used, for instance a carboxylated polyphosphazene polymer. Thin films or membranes may be sprayed onto stronger backing materials, for a variety of purposes, such as filtration, separation or protection.

The polymer being sprayed may either be in the tundish by itself in a liquid form or dissolved in a suitable solvent, as aforesaid. Adjusting the concentration of the polymer of the solution affects the thickness of the membrane which is produced. Other variables controlling the thickness of the membrane are the nozzle pressure and gas flow which may be varied from about 14 psia to about 26 psia, or from about 100 slpm to abut 500 slpm (standard liter per minute), the translational speed of the substrate with respect to the nozzle, the distance between the substrate and the nozzle, the size of the liquid orifice in the nozzles which includes the total size of several orifices if more than one is being used, the viscosity of the polymer solution, by tundish temperature and polymer concentration, which in the absence of solvent may be 100%, as well as the average molecular weight of the polymer. Nozzle pressure and flow rate are dependent variables.

One of the scaling factors in system design is the cross-sectional area of the nozzle throat, whereby the pressure range is commonly referenced. The nebulizer performance in the CAP process is affected by the nozzle geometry and gas temperature, as is known. The properties of the deposited material are also influenced or controlled by the solidification rates of the droplets, both in flight and after impact.

For a polyphosphazene system, generally a molecular weight between 100,000 to 300,000 amu is preferred. An overall membrane thickness of approximately 9 microns has been found useful, although membranes having an overall thickness of between about 5 and about 25 microns have been made and found to be useful. In general, the thickness of the active or most dense portion of the polyphosphazene membranes produced has been about 1 micron. It has been found that the membranes laid down by the CAP process differ physically from membranes made by any other method, such as by spincasting or doctor blade.

Figure 2:
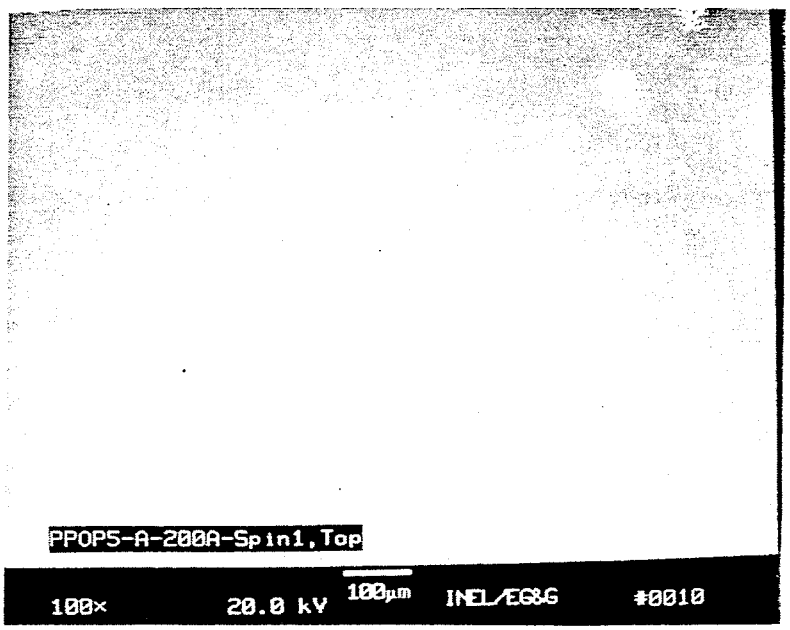
FIG. 2 is a photomicrograph of a solution cast material at 100 times magnification.
Figure 3:
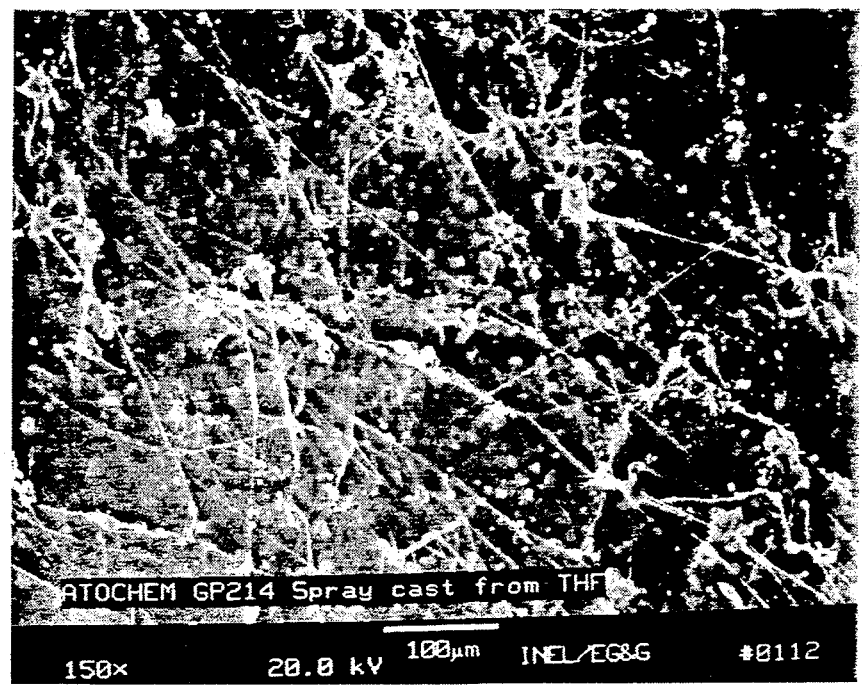
FIG. 3 is a photomicrograph of a spray cast material at 150 times magnification.
Figure 4:
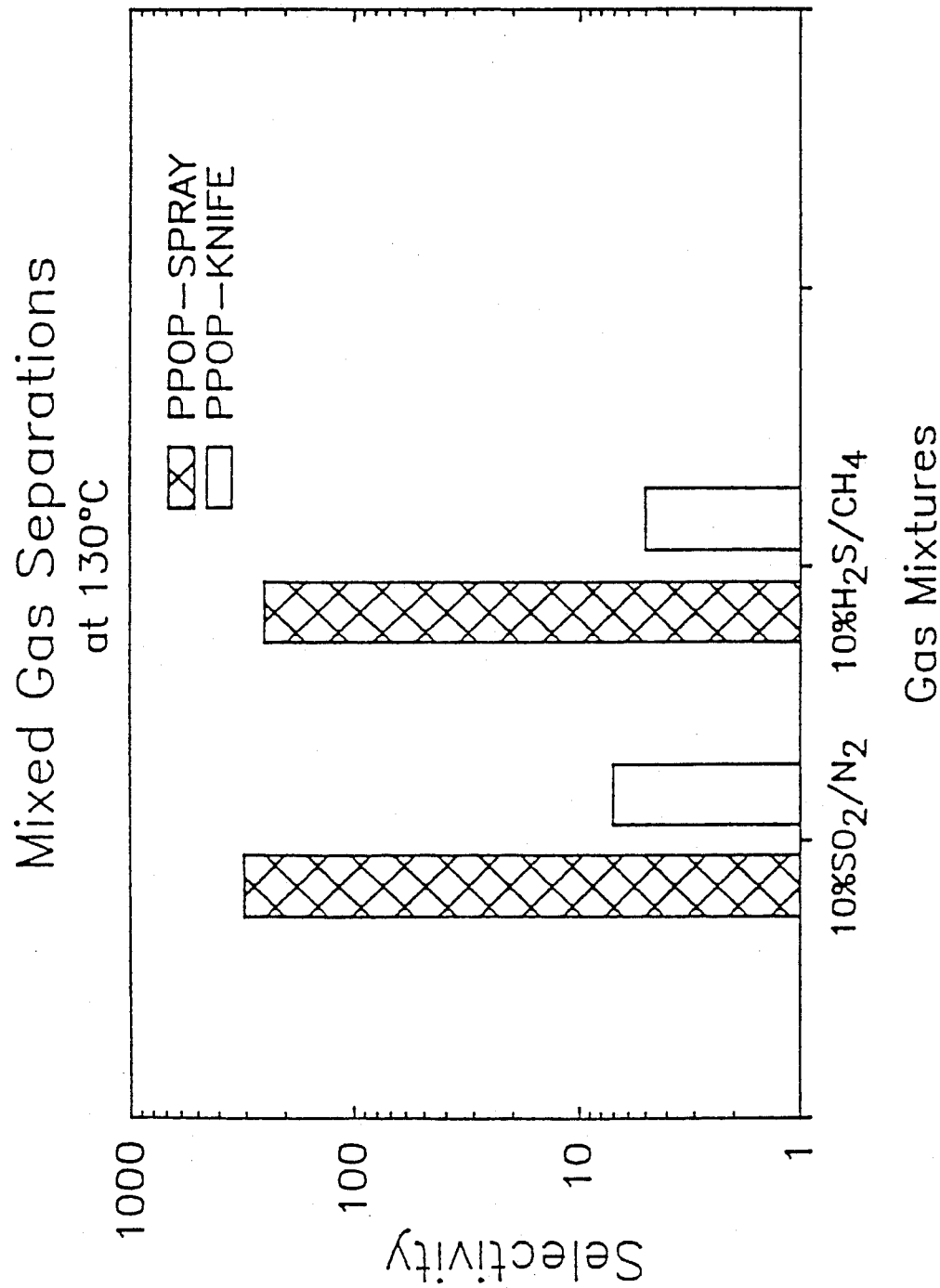
FIG. 4 is a graphical comparison of the selectivity of various membranes prepared by the knife casting method and the spray method of the present invention.

Conventional methods form symmetrical membranes. Whereas, with the CAP process, membranes are not symmetrical. FIGS. 1-3 illustrate membranes laid down with the spray cast method, see FIG. 1, the knife cast method, see FIG. 2, and the CAP process producing the membrane of the present invention, see FIG. 3. It is clear from the photomicrographs that what is produced by the CAP method is different and it is understood that this difference resides in the variation and density from the surface which is adjacent the substrate to the surface opposite thereto. FIG. 4 shows the surprising increase in selectivities between membranes formed by spin or spray casting polyphosphazene and membranes which are spray formed. For instance, it has been found that at 80° C. selectivity of acid gases (10% $SO_2$/90% nitrogen, 10% $H_2S$/90% $CH_4$, 10% $CO_2$/90% $CH_4$) for spray formed membranes were measured to be, respectively, 71:1, 15:1, and 4.5:1. Knife-cast membranes on the other hand exhibited selectivities of 18:1, 7:1 and 3.5:1, respectively, under the same conditions. As the temperature was increased to 130° C., the selectivities of the spray formed membranes were further enhanced to a surprising and unexpected degree. At 130° C., selectivities for 10% $SO_2$/90% $N_2$ and 10% $H_2S$/90% $CH_4$ were measured to be 303:1 and 344:1, respectively, for the spray formed polyphosphazene membranes whereas knife-cast polyphosphazene membranes of the same polymer at 130° C. exhibited selectivities of 7.2:1 and 5:1. As can be seen therefore, the increase in selectivities in the spray cast membranes was remarkable not only at 80° C. but also and more unexpectedly at the higher temperatures of 130° C.

The liquid/liquid separation performance of spray formed membranes is equally impressive both in terms of their ability to separate out specific components from liquid mixtures as well as their ability to do so with high throughput (flux). As an example, pervaporation experiments were conducted at 65° C. using a driving pressure at 200 psig across the membranes. Spray formed membranes of polyphosphazene were found to give complete component separation for halogenated hydrocarbons in a mixture of halogenated hydrocarbons and alcohols in water (0.5% methylene chloride, 0.5% chloroform, 0.5% methanol, 0.5% ethanol). The spray formed membranes were found to purify the mixture such that the permeate composition was 41.8% methanol, 58.2% ethanol together with a small amount of water. The halogenated hydrocarbon in the permeate was extremely low, below the detection limit in gas chromatographic analysis. Moreover, the flux through the membrane (2.83 1/m²hr) was remarkably greater than that observed with knife cast membranes of the same thickness tested under the same conditions (0.1–0.41/m²hr).

Examples of detachable membranes are bis(phenoxy)-phosphazene on glass which is detachable from the substrate by water immersion. Adherent polymer films not only include paint or lacquer but as stated carboxylated polymers wherein the polymer chealates to the surface of the metal. In general, the nebulizing gas is preferably an inert gas such as argon but where a chlorinated polymer is desired, for instance, chlorinated polyethylene, the argon carrier gas may be seeded with sufficient chlorine such that as the polyethylene is sucked into the nozzle throat it is contacted with the chlorine containing argon and thereafter reacts from the nozzle throat to the substrate, thereby to produce a chlorinated polyethylene. Generally, sulfur dioxide may be included with the exposure of the sprayed material to ultraviolet light to expedite the reaction, as is known. Polyurethanes and cyanoacrylates cure by absorption of moisture from the air. When spraying polyurethanes and cyanoacrylates by the CAP method, water vapor may be included with the carrier argon gas in order to facilitate the cross linking reaction between the urethanes and the cyanoacrylates.

By heating the polymer in the reservoir, the viscosity of the material is changed. Heating a polymer to above its melting point permits the polymer without the presence of a solvent to be drawn from the tundish into the nozzle throat via the suction created therein due to the passage of the carrier gas, thereby eliminating undesirable VOC emissions. Similarly, the temperature of the nozzle body can be varied to prevent the liquid orifices from clogging. The temperature of the nebulizing gas influences the solvent evaporation rate of the dissolved polymers where a solvent is used. If the temperature of the system is too high, the spray particle solid fraction will be too great which will result in poor droplet compaction and increased over spray losses, and therefore, lower yields. On the other hand, if the vapor pressure of the polymer solvent is low at room temperature, then it is advisable to heat the gas to expedite solvent evaporation. Where molten polymers are used without solvents, control of the gas temperature permits control of the solidification rate of the sprayed material. Substrate temperatures also influence the solvent evaporation rate and the solidification rate of the sprayed materials. Variation of the substrate temperature can be used to assist thermal cross linking of well known polymers such as the cyclomatrix polyphosphazenes or other polymers which crosslink upon exposure to elevated temperatures, such as by heating a substrate to 450° C. Accordingly, film properties can be controlled even in the absence of solvents, thereby permitting films with enhanced characteristics with little, if any, solvent emission.

The system is very flexible. For instance, with a cross linked polymer, the crosslinking agent may be mixed with a liquid polymer at the reservoir, at the nozzle throat via a secondary liquid feed, or at the substrate via a second set of spray nozzles. The extent to which the crosslinking action is permitted to proceed is controlled by the composition and concentration of the crosslinking agent as well as the selection of the mixing location of the crosslinking agent with the primary polymer. Examples of crosslinking agents are high energy photons or other radiation, peroxides, and superoxides. Specifically, polyethylene is crosslinked by ultraviolet light via radiation or by peroxide, such as the dicumyl peroxide previously mentioned. Because the temperature of the CAP process can be controlled either at the tundish, at the plume produced by the nozzle, or at the substrate, the temperature kinetics of any chemical reaction can be closely controlled, whether that is by controlling the temperature in the tundish or by controlling the carrier gas temperature or the substrate temperature or any combination thereof. For instance, crosslinking reactions of spray formed cyclomatrix polyphosphazene films dissolved in acetone can occur at the substrate by heating the substrate to about 450° C. Heat cured adhesive systems such as polyurethanes and polyamides are other candidates for the CAP method.

Moreover, the CAP process may be used to coat metal parts with thin films of polymers, wherein the part may have a thin, very dense coating of 1–5 microns or have a thicker coating of up to 25 microns with constant or various densities.

By way of example only, without limiting the scope of the invention, the following membranes were prepared according to the scheme hereafter described.

Chemical Name of Polymer: poly[bis(phenoxy)phosphazene]
Commercial Supplier/Lot No.: Atochem, Lot No. GP-214
Average Molecular Weight of Polymer: 150,000 amu
Polymer Solvent: Tetrahydrofuran (THF)
Polymer Concentration: 7% polymer by weight
Atomizing Gas: Argon
Gas Flow Rate through Nozzle at 20 Psia: 770 slpm
Gas Pressure at Nozzle Outlet: Ambient (12.5 psia)
Membranes were detached from the glass substrates by water immersion
Membrane thicknesses were found to be ~5-10 microns.

| NOZZLE DATA | J0120, 1/12/90, RUN A |
|---|---|
| OBJECTIVE: | To spray form a linear polyphosphazene membrane on a glass substrate. |
| NOZZLE INFORMATION | |
| NOZZLE NAME: | DN3219AG |
| ENTRANCE ANGLE: | 14 |
| EXIT ANGLE: | 14 |
| DISTANCE FROM LIQUID ORIFICE TO NOZZLE EXIT (in.): | 1.018 |
| NUM. OF ORIFICES: | 6 |
| ORIFICE AREA ea(sq. in.): | 0.000314 |
| A1 = TOTAL AREA OF LIQUID ORIFICES (sq. in.): | 0.0019 |
| A2 = CROSS SECTIONAL AREA OF NOZZLE THROAT (sq.in.): | 0.06 |
| A3 = CROSS SECTIONAL AREA OF GAS STREAM AT NOZZLE EXIT (sq. in.): | 0.266 |
| A2/A1 = | 31.8 |
| A3/A1 = | 141.2 |
| A3/A2 = | 4.4 |
| PRODUCT CHARACTERISTICS | |
| MATERIAL SPRAYED: | linear PPOP, 7% in THF |
| SAMPLE VIAL: | E |
| MEMBRANE DESCRIPTION: | 1.5 inch wide strip down the center of the plate was thicker than the rest of the membrane. This region, and the region outside the strip, appeared to be of uniform thickness. |
| MEMBRANE DIMENSIONS: | 2.88 × 2 × thickness not measured |
| TIME INTERVAL OF PRODUCT FORMATION (sec): | 0.18 |
| SAMPLE COLLECTION EFFECIENCY (POOR, FAIR, GOOD, EXCELLENT): | excellent |
| SUBSTRATE INFORMATION | |
| SUBSTRATE MATERIAL: | glass microscope slide |
| SUBSTRATE DIMENSIONS (in.): | 2.88 × 2 × 0.043 |
| SUBSTRATE CONDITION AND PREPARATION FOR COATING: | Substrate cleaned with methanol. |
| EXPERIMENTAL PARAMETERS | |
| GAS SUPPLY: | liquid argon |
| DISTANCE FROM LIQUID ORIFICE TO SUBSTRATE (in.): | 6.25 |
| SUBSTRATE SPEED (in./min.): | 685 |
| SUBSTRATE TEMP. (deg. C.): | 19 |
| GAS TEMPERATURE (deg. C.): | 19 |
| POLYMER SOLUTION TEMPERATURE (deg. C.): | 43 |
| VOLUME OF POLYMER SOLUTION (ml): | 2.5 |
| NOZZLE INLET PRESSURE, PT7 (psia): | 20 |
| OPERATORS: | Kevin McHugh |
| COMMENTS: | |

Data files, worm drive E:\FY90-1\ERDP\J0120\SYS1R (and SYS1C) −0.PRN to −2.PRN.

| NOZZLE DATA | J0260, 1/26/90, RUN A |
|---|---|
| OBJECTIVE: | To spray form a linear polyphosphazene membrane on a glass substrate. |
| NOZZLE INFORMATION | |
| NOZZLE NAME: | DN3219AG |
| ENTRANCE ANGLE: | 14 |
| EXIT ANGLE: | 14 |
| DISTANCE FROM LIQUID ORIFICE TO NOZZLE EXIT (in.): | 1.018 |
| NUM. OF ORIFICES: | 6 |
| ORIFICE AREA ea(sq. in.): | 0.000314 |
| A1 = TOTAL AREA OF LIQUID ORIFICES (sq. in.): | 0.0019 |
| A2 = CROSS SECTIONAL AREA OF NOZZLE THROAT (sq.in.): | 0.06 |
| A3 = CROSS SECTIONAL AREA OF GAS STREAM AT NOZZLE EXIT (sq. in.): | 0.266 |
| A2/A1 = | 31.8 |
| A3/A1 = | 141.2 |
| A3/A2 = | 4.4 |
| PRODUCT CHARACTERISTICS | |
| MATERIAL SPRAYED: | linear PPOP |

| | |
|---|---|
| SAMPLE VIAL: | E |
| MEMBRANE DESCRIPTION: | Thicker at the center than at the edges of the substrate. |
| MEMBRANE DIMENSIONS | 7.75 × 4 |
| TIME INTERVAL OF PRODUCT FORMATION (sec): | 1.19 |
| SAMPLE COLLECTION EFFICIENCY: (POOR, FAIR, GOOD, EXCELLENT): | excellent |
| SUBSTRATE INFORMATION | |
| SUBSTRATE MATERIAL: | glass |
| SUBSTRATE DIMENSIONS (in.): | 7.75 × 4 × .125 |
| SUBSTRATE CONDITION AND PREPARATION FOR COATING: | Cleaned with methanol. |
| EXPERIMENTAL PARAMETERS | |
| GAS SUPPLY: | liquid argon |
| DISTANCE FROM LIQUID ORIFICE TO SUBSTRATE (in.): | 10.62 |
| SUBSTRATE SPEED (in./min.): | 244 |
| SUBSTRATE TEMP. (deg. C.): | 20 |
| GAS TEMPERATURE (deg. C.): | 17 |
| POLYMER SOLUTION TEMPERATURE (deg. C.): | 46 |
| VOLUME OF POLYMER SOLUTION (ml): | 3.6 |
| NOZZLE INLET PRESSURE, PT7 (psia): | 20 |
| OPERATORS: | Kevin McHugh |
| COMMENTS: | |

Data files, worm drive E:\FY90-1\ERDP\J0260\SYS1R (and SYS1C) −3.PRN to −5.PRN.
Sample given to Mark Stone.

While there has been disclosed what is considered to be the preferred embodiment of the present invention, it is understood that various changes in the details may be made without departing from the spirit, or sacrificing any of the advantages of the present invention.

The embodiments of the invention in which on exclusive property or privilege is claimed are defined as follows:

1. A method of forming a polymer film having controlled chemical and physical characteristics, comprising forming a solution of a polymer or polymer precursor, directing a plume of nebulized droplets of the polymer or polymer precursor toward a substrate from a converging/diverging nozzle having a throat at which the polymer or a precursor thereof is introduced and an exit from which the nebulized droplets of the polymer or precursor thereof leave entrained in a carrier gas toward a substrate, and providing relative movement between the nozzle and the substrate to form a polymer film on the substrate.

2. The method of claim 1, wherein the plume is formed by passing a gas inert to the polymer or polymer precursor through the throat of the converging/diverging nozzle to create a vacuum for transporting the polymer or polymer precursor from a reservoir therefor to the throat.

3. The method of claim 1, wherein the carrier gas has at least a portion thereof reactive with the polymer or polymer precursor passing through the throat of the converging/diverging nozzle for transporting the polymer or polymer precursor from a reservoir therefor to the throat, the polymer or polymer precursor reacting with the reactive portion of the carrier gas from the throat to the substrate.

4. The method of claim 1, wherein the polymer is detachable from the substrate.

5. The method of claim 1, wherein the polymer is mechanically bound to the substrate surface.

6. The method of claim 1, wherein the polymer is chemically bound to the substrate surface.

7. The method of claim 1, wherein the film has a predetermined thickness controlled by varying one or more of the carrier gas flow rate through the nozzle, the concentration of polymer or polymer precursor in a solution thereof, the molecular weight of the polymer, the nozzle to substrate distance, and the relative movement between the substrate and the nozzle.

8. The method of claim 1, wherein the carrier gas is argon, the polymer or polymer precursor is dissolved in a solvent to form a solution in a reservoir therefor.

9. The method of claim 8, wherein the film characteristics of thickness, density and porosity are controlled by varying one or more of argon flow rate through the nozzle, the concentration of the polymer in a solution thereof, the molecular weight of the polymer, the nozzle to substrate distance and the relative movement between nozzle and substrate.

10. The method of claim 1, wherein the polymer is a co-polymer.

11. The method of claim 10, wherein the co-polymer constituents are mixed before introduction into the carrier gas.

12. The method of claim 10, wherein the co-polymer constituents are mixed after one of the polymers is introduced into the carrier gas.

13. The method of claim 1, wherein the polymer film is formed without dissolving the polymer or precursor thereof in a solvent.

14. A method of spraying a copolymer formed from first and second polymers against a substrate comprising forming first and second solutions of polymers, directing a plume of nebulized polymer droplets toward a substrate from a converging/diverging nozzle having a throat at which at least one or the polymers is introduced from a reservoir therefor and an exit from which the nebulized polymer droplets leave entrained in a carrier gas to produce a copolymer at the substrate.

15. The method of claim 14, wherein the first polymer and the second polymers are in the reservoir.

16. The method of claim 14, wherein the first polymer is in the reservoir and the second polymer is introduced into the nozzle throat to produce a plume of copolymer droplets.

17. The method of claim 14, wherein the first polymer is in the reservoir and the second polymer is introduced into the carrier gas after the nozzle throat.

18. The method of claim 14, wherein the copolymer has a predetermined thickness which is substantially uniform.

19. The method of claim 14, wherein the first polymer is a polyurethane and the second polymer is a polycyanoacrylate and the carrier gas includes water vapor.

20. An asymmetric polymer membrane when manufactured according to claims 1 or 14 having a dense portion and a less dense portion, said dense portion having a thickness up to about 1 micron.

21. The asymmetric polymer membrane of claim 20, wherein the polymer membrane has a substantially uniform thickness.

22. The asymmetric polymer membrane of claim 20, wherein the polymer membrane has a substantially uniform thickness of not more than about 25 microns.

23. The asymmetric polymer membrane of claim 22, wherein said polymer is polyphosphazene having a molecular weight in the range of from about 100,000 AMU to about 300,000 AMU.

24. The asymmetric polymer membrane of claim 20, wherein the polymer is a co-polymer.

25. The polymer of claim 23, wherein the polyphosphazene is a linear or a cyclolinear or a cyclomatrix polyphosphazene.

26. The polymer of claim 25, wherein the polyphosphazene is poly bis (2,2,2-trifluoroethoxy) phosphazene.

27. An asymmetric polymer membrane when manufactured according to claims 1 or 14 for use in separating components of a fluid, said asymmetric polymer membrane comprising a dense portion and a less dense portion on a backing member, wherein said polymer membrane is not more than about 25 microns thick and is selected from the group consisting of:

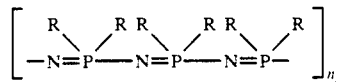

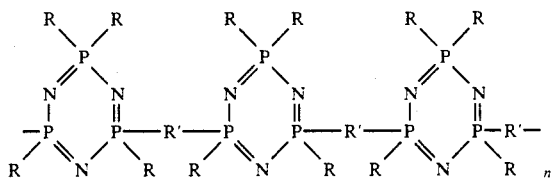

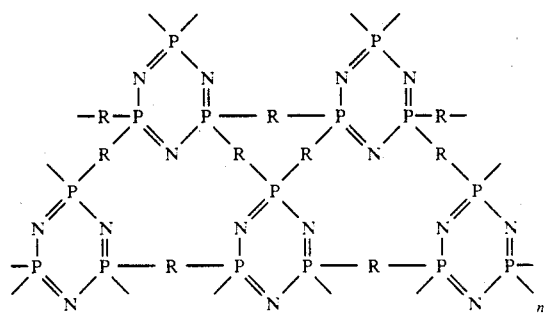

28. The method of claim 1 wherein the solution of polymer or polymer precursor is formed by melting the polymer or polymer precursor.

29. The method of claim 14 wherein at least one of the polymer solutions is formed by melting the polymer.

* * * * *